United States Patent [19]

Takahashi et al.

[11] Patent Number: 4,717,628
[45] Date of Patent: Jan. 5, 1988

[54] MAGNETOOPTICAL STORAGE ELEMENT

[75] Inventors: Akira Takahashi, Nara; Yoshiteru Murakami, Nishinomiya; Hiroyuki Katayama, Nara; Junji Hirokane, Tenri; Kenji Ohta, Yao, all of Japan

[73] Assignee: Sharp Kabushiki Kaisha, Osaka, Japan

[21] Appl. No.: 830,862

[22] Filed: Feb. 19, 1986

[30] Foreign Application Priority Data

Feb. 21, 1985 [JP] Japan .................................. 60-34133

[51] Int. Cl.$^4$ .............................................. G11B 7/24
[52] U.S. Cl. ..................................... 428/457; 428/694; 428/900; 428/928
[58] Field of Search ............... 428/694, 900, 457, 928; 365/122; 360/131, 135; 369/288

[56] References Cited

U.S. PATENT DOCUMENTS

| | | | |
|---|---|---|---|
| 4,390,600 | 6/1983 | Ohta et al. | 428/900 |
| 4,414,650 | 11/1983 | Ohta et al. | 365/122 |
| 4,467,383 | 8/1984 | Ohta et al. | 360/131 |
| 4,489,139 | 12/1984 | Ohta et al. | 428/621 |
| 4,544,443 | 1/1985 | Ohta et al. | 156/643 |
| 4,610,912 | 9/1986 | Takahashi et al. | 428/213 |
| 4,634,617 | 1/1987 | Ohta et al. | 428/65 |

FOREIGN PATENT DOCUMENTS 161807 11/1985 European Pat. Off. .
208501 12/1982 Japan .

Primary Examiner—George F. Lesmes
Assistant Examiner—William M. Atkinson
Attorney, Agent, or Firm—Birch, Stewart, Kolasch and Birch

[57] ABSTRACT

A magnetooptical storage element having a recording layer of a multi-layer construction including a reflective layer. The reflective layer is made of an aluminium-nickel alloy obtained by adding nickel to aluminium such that the aluminium-nickel alloy contains approximately 2 to 10 atomic percent of nickel.

12 Claims, 3 Drawing Figures

MAGNETOOPTICAL STORAGE ELEMENT

BACKGROUND OF THE INVENTION

The present invention generally relates to storage elements and more particularly, to a magnetooptical storage element in which recording, reproduction, erasure, etc. of data are performed by irradiating laser beams, etc. thereto.

Recently, magnetooptical storage elements have been greatly developed as optical memory elements enabling recording, reproduction and erasure of data. Particularly, a magnetooptical storage element in which a thin film made of an amorphous alloy containing rare-earth transition metals is used as a storage medium has such advantages that a recorded bit is not affected by the grain boundary and the film of the storage medium can be manufactured over a large area relatively easily, thereby attracting special attention. However, in the above described magnetooptical storage element in which the thin film made of the amorphous alloy containing the rare-earth transition metals is used as the storage medium, the photomagnetic effect (e.g. Kerr effect, Faraday effect) cannot be generally achieved to a full extent, thus resulting in an insufficient signal-to-noise ratio (S/N) of reproduced signals.

In order to eliminate such a problem, an element construction referred to as a "reflective film construction" has been conventionally employed in the magnetooptical storage elements as disclosed in, for example, Japanese Patent Laid-Open Publication No. 12428/1982 (Tokkaisho 57-12428). FIG. 1 shows a prior art magnetooptical storage element having the reflective film construction. The prior art magnetooptical storage element includes a transparent substrate 1, a transparent dielectric film 2 having a refractive index higher than that of the substrate 1, a thin film 3 made of an amorphous alloy containing rare-earth transition metals, a transparent dielectric film 4 and a metallic reflective film 5. In the known magnetooptical storage element of the above described construction, the thin film 3 has a sufficiently small thickness. Accordingly, when a laser beam L is incident upon the thin film 3, a portion of the laser beam L passes through the thin film 3. Therefore, both the Kerr effect, which is achieved by reflection of the laser beam L on the surface of the thin film 3, and the Faraday effect, which is achieved by transmission of the laser beam L through the thin film 3 upon reflection of the laser beam L on the reflective film 5 after the laser beam L has passed through the thin film 3, are exercised on the reproduced light. A Kerr rotational angle of the reproduced light superficially increases as large as several times that of a magnetooptical storage element subjected to only Kerr effect. Furthermore, the dielectric film 2 disposed on the thin film 3 also contributes to the increase of the Kerr rotational angle.

As one example of the known magnetooptical storage element in FIG. 1, the substrate 1 is formed by a glass plate, while the dielectric film 2 is made of SiO so as to have a thickness of 120 nm. Furthermore, the thin film 3 is made of Gd-Tb-Fe alloy so as to have a thickness of 15 nm, while the dielectric film 4 is made of $SiO_2$ so as to have a thickness of 50 nm. Meanwhile, the reflective film 5 is made of Cu so as to have a thickness of 50 nm. In this example of the known magnetooptical storage element, the Kerr rotational angle increased to 1.75° superficially.

Hereinbelow, a reason why the Kerr rotational angle increases extraordinarily in the magnetooptical storage element of the above described construction will be described. In the case where the laser beam L is irradiated onto the thin film 3 from the substrate 1 as shown in FIG. 1, reflection of the incident laser beam L is repeated in the dielectric film 2, so that interference of the repeatedly reflected laser beam L takes place and thus, the Kerr rotational angle increases superficially. At this time, as the refractive index of the dielectric film 2 is made larger, the dielectric film 2 further contributes to the increase of the Kerr rotational angle. Furthermore, an arrangement in which the reflective film 5 is disposed rearwardly of the thin film 3 also increases the Kerr rotational angle superficially. By interposing the dielectric film 4 between the thin film 3 and the reflective film 5, the Kerr rotational angle is further increased superficially.

Accordingly, a principle of this phenomenon will be described qualitatively, hereinbelow. It is assumed here that a reflective layer A is constituted by the dielectric film 4 and the reflective film 5. Thus, a first light ray incident upon the thin film 3 from the substrate 1 is reflected on the reflective layer A after passing through the thin film 3 and then, reversely passes through the thin film 3 again. Meanwhile, a second light ray incident upon the thin film 3 from the substrate 1 is directly reflected on the surface of the thin film 3 without passing through the thin film 3. Therefore, the first light ray which has passed through the thin film 3 reversely upon its reflection on the reflective layer A and the second light ray which has been reflected on the surface of the thin film 3 are combined with each other. At this time, since both the Kerr effect, which is achieved by reflection of the incident light L on the surface of the thin film 3, and the Faraday effect, which is achieved by transmission of the incident light L through the thin film 3, are produced in combination, the Kerr rotational angle is increased superficially.

In the magnetooptical storage element of such construction, it becomes highly important how the above described Faraday effect is added to the Kerr effect. Regarding the Faraday effect, if the thin film 3 is increased in thickness, the rotational angle can be increased. However, in this case, since the incident laser beam L is absorbed by the thin film 3, a desired purpose cannot be achieved. Therefore, a proper thickness of the thin film 3 ranges from approximately 10 to 50 nm and is determined based on the wave length of the laser beam L, the refractive index of the reflective layer A, etc. A requirement for the reflective layer A is that the reflective layer A should have a high refractive index.

Thus, in the magnetooptical storage element of the above described arrangement in which the dielectric film 2 is interposed between the substrate 1 and the thin film 3, and the reflective layer A is disposed rearwardly of the thin film 3, the Kerr rotational angle can be increased effectively. As is clear from the foregoing, a requirement for the reflective film 5 is that the reflective film 5 should have a high refractive index. In order to satisfy the requirement for the reflective film 5, the reflective film 5 is made of one of such materials as Au, Ag, Cu, Al, etc. However, these materials of the reflective film 5 undesirably lower the recording sensitivity of the storage medium due to their excellent thermal conductivity. Namely, in magnetooptical storage elements, recording of data is generally performed by inverting the orientation of magnetization through not only local heating of the storage medium by the use of laser beams but application of an auxiliary magnetic field to the storage medium from its outside. Thus, when the material of the reflective film has excellent thermal conductivity, heat given to the storage medium at the time of recording of the data is instantaneously diffused and thus, the temperature of the storage medium cannot be raised sufficiently to a required level.

Accordingly, the reflective film 5 is required to have not only a high refractive index but a low coefficient of thermal conductivity. The above described materials such as Al, Cu, AG and Au for the reflective film 5 are of high refractive indexes but have high coefficients of thermal conductivity. Therefore, the reflective film 5 made of one of the materials such as Al, Cu, Ag and Au is capable of improving quality of reproduced signals but disadvantageously lowers recording sensitivity of the storage medium.

SUMMARY OF THE INVENTION

Accordingly, an essential object of the present invention is to provide a magnetooptical storage element in which reproduced signals are improved to quality without a drop of its recording sensitivity, with substantial elimination of the disadvantages inherent in conventional magnetooptical storage elements of this kind.

In order to accomplish this object of the present invention, a magnetooptical storage element embodying the present invention comprises a reflective layer made of an alloy containing aluminium and one of elements for lowering a coefficient of thermal conductivity of aluminium, which elements include nickel, palladium, platinum, chromium and molybdenum.

In accordance with the present invention, since the coefficient of thermal conductivity of aluminium of the reflective layer is lowered by a special processing, reproduced signals can be improved in quality without a drop of the recording sensitivity of the magnetooptical storage element.

BRIEF DESCRIPTION OF THE DRAWINGS

This object and features of the present invention will become apparent from the following description taken in conjunction with the preferred embodiment thereof with reference to the accompanying drawings, in which.

Before the description of the present invention proceeds, it is to be noted that like parts are designated by like reference numerals throughout several views of the accompanying drawings.

DETAILED DESCRIPTION OF THE INVENTION

Figure 1:
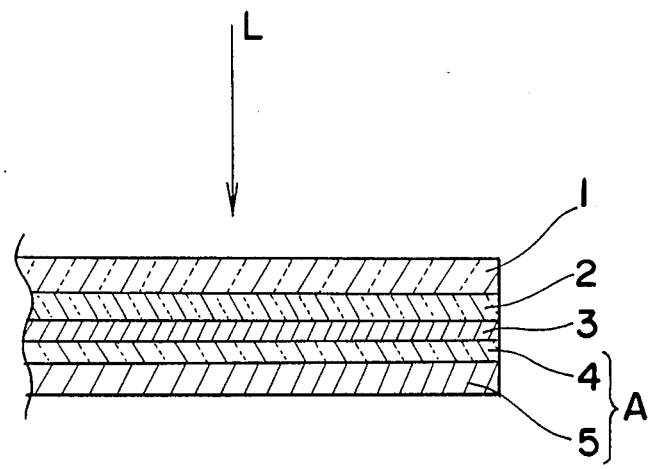
FIG. 1 is a partial cross-sectional view of a prior art magnetooptical storage element (already referred to)
Figure 2:
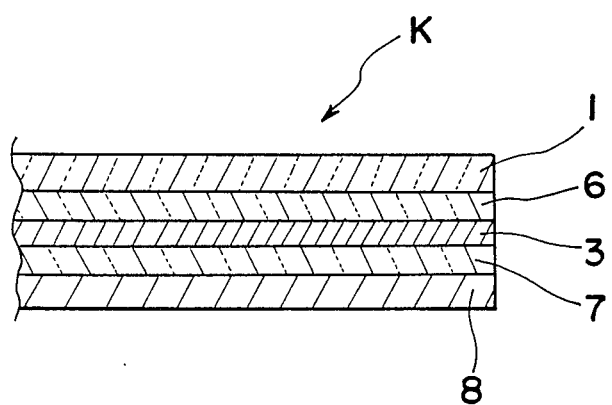
FIG. 2 is a partial cross-sectional view of a magnetooptical storage element according to one embodiment of the present invention.

Referring now to the drawings, there is shown in FIG. 2, a magnetooptical storage element K according to one embodiment of the present invention. The magnetooptical storage element K includes a transparent substrate 1 made of glass, polycarbonate, acrylic material or the like, a first transparent dielectric film 6 having a thickness of, for example, 100 nm and made of aluminium nitride (AlN), a thin film 3 having a thickness of, for example, 27 nm and made of an amorphous alloy containing rare-earth transition metals, a second transparent dielectric film 7 having a thickness of, for example, 35 nm and made of aluminium nitride (AlN), and a reflective film 8 having a thickness of, for example, not less than 30 nm, which are sequentially piled one on another in this order. The thin film 3 is made of, for example, Gd-Tb-Fe alloy.

The reflective film 8 is made of an alloy containing aluminium and one of elements for lowering a coefficient of thermal conductivity of aluminium, which elements include nickel, palladium, platinum, chromium and molybdenum. In this embodiment, nickel is employed as one of the elements for lowering the coefficient of thermal conductivity of aluminium. Namely, in order to manufacture the reflective film 8, a target obtained by adding nickel to aluminium is sputtered. In the case where the reflective film 8 is made of Al-Ni alloy as described above, the following advantage is achieved. Namely, aluminium has a high coefficient of thermal conductivity as referred to earlier. Thus, when the reflective film 8 is made of aluminium, aluminium acts as a heat sink at the time of thermomagnetic recording by the use of laser beams, etc., so that such phenomena as a drop of recording sensititivy or a drop of recording speed may take place. On the other hand, a coefficient of thermal conductivity of the Al-Ni alloy is smaller than that of aluminium itself. Therefore, when the reflective film 8 is made of the Al-Ni alloy, recording sensitivity is considerably improved as compared with that in the case where the reflective film 8 is made of aluminium only.

Figure 3:
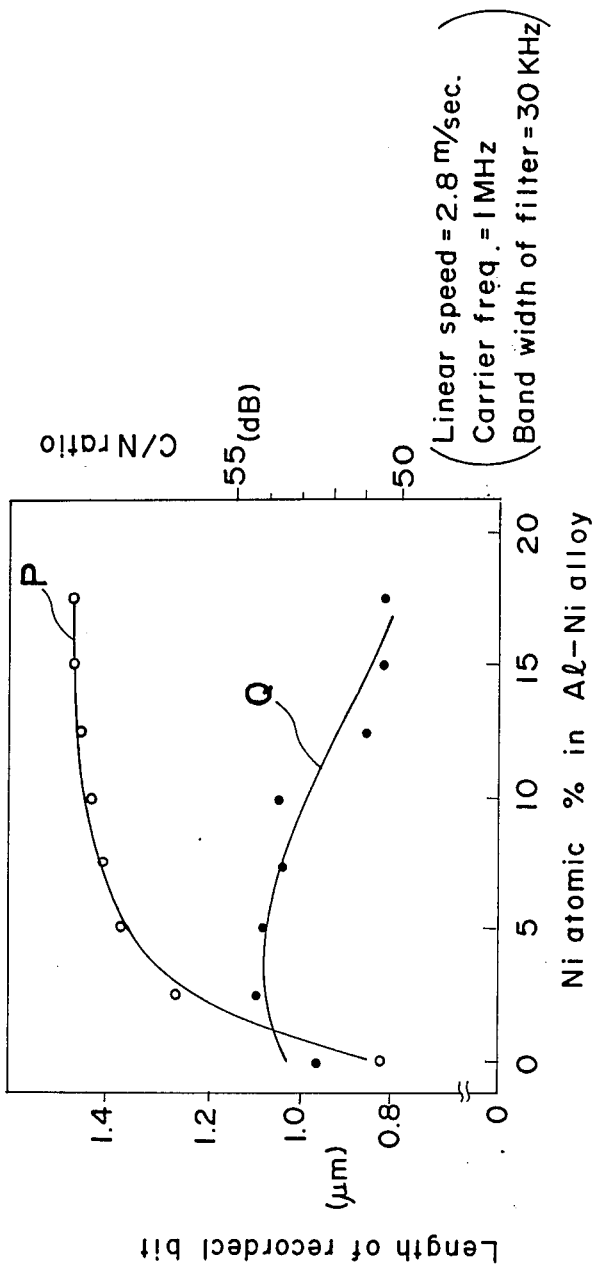
FIG. 3 is a graph indicative of relation among composition of nickel in an aluminium-nickel alloy for a reflective layer of the magnetooptical storage element of FIG. 2, a C/N ratio and recording sensitivity.

FIG. 3 is a graph indicative of relation among composition of nickel in the Al-Ni alloy of the reflective film 8, recording sensitivity and carrier-to-noise (C/N) ratio representing quality of reproduced signals. In FIG. 3, the recording sensitivity is expressed by length of a bit recorded at the time when laser beam having a predetermined amount of energy have been irradiated for a fixed time period. Namely, the recording sensitivity is deemed to be higher when the recorded bit becomes larger in length. In FIG. 3, curves P and Q represent the length of the recorded bit (recording sensitivity) and the C/N ratio, respectively. It will be readily seen from FIG. 3 that as composition of nickel is increased in the Al-Ni alloy constituting the reflective film 8, the recording sensitivity is improved. Meanwhile, in this case, the C/N ratio drops on the contrary.

Since the mechanism of the former phenomenon that the recording sensitivity is improved in response to the increase of composition of nickel in the Al-Ni alloy of the reflective film 8 has been described above, the latter phenomenon that the C/N ratio drops in response to increase of composition of nickel in the Al-Ni alloy of the reflective film 8 will be described, hereinbelow. Table 1 below shows change of refractive index of the Al-Ni alloy versus change of composition (atomic %) of nickel in the Al-Ni alloy. It is to be noted that characters n and k in Table 1 represent real part and imaginary part of the refractive index of the Al-Ni alloy, respectively.

TABLE 1

| Ni (atomic %) | n | k |
| --- | --- | --- |
| 0 | 1.97 | −7.22 |
| 2.5 | 1.74 | −6.91 |
| 5 | 1.96 | −7.03 |
| 7.5 | 2.19 | −6.83 |
| 10 | 2.46 | −6.73 |
| 12.5 | 2.71 | −6.59 |
| 15 | 2.96 | −6.22 |
| 17.5 | 3.33 | −6.14 |

As shown in Table 1, as the percentage composition of nickel is increased, the real part of the refractive index increases, while absolute value of the imaginary part of the refractive index decreases. Namely, when the percentage composition of nickel in the Al-Ni alloy is increased, reflectivity of the Al-Ni alloy drops, thereby resulting in deterioration of performance of the reflective film 8. As a result, an effect for superficially increasing the Kerr rotational angle is lessened as shown in FIG. 3 and thus, the C/N ratio representing quality of reproduced signals is deteriorated. In the case where the reflective film 8 in the recording layer of the multi-layer construction is made of the Al-Ni alloy, nickel is required to be set at an optimum composition in the Al-Ni alloy. In order to not only improve quality of the reproduced signals but raise the recording sensitivity, it will be understood from FIG. 3 that the optimum composition of nickel in the Al-Ni alloy ranges from approximately 2 to 10 atomic %.

As is clear from the foregoing description, in accordance with the present invention, it becomes possible to obtain the magnetooptical storage element having reproduced signals of high quality and high recording sensitivity.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A magnetooptical storage element having a multi-layer construction including a reflective layer, wherein said reflective layer comprises an aluminium-nickel alloy containing approximately 2 to 10 atomic percent of nickel.

2. A magnetooptical storage element having a multi-layer construction including a reflective layer, wherein said reflective layer comprises an aluminium-nickel alloy containing an effective amount of nickel for lowering the coefficient of thermal conductivity of aluminum.

3. A magnetooptical storage element as claimed in claim 2, wherein said aluminium-nickel alloy contains approximately 2 to 10 atomic percent of nickel.

4. A magnetooptical storage element comprising a transparent substrate and a recording element of multi-layer construction disposed on said substrate wherein said recording element includes a reflective layer made of an alloy containing aluminum and an effective amount of an element for lowering the coefficient of thermal conductivity of aluminum.

5. A magnetooptical storage element as claimed in claim 4, wherein said element is one of nickel, palladium, platinum, chromium and molybdenum.

6. A magnetooptical storage element as claimed in claim 4, wherein said element is nickel and said alloy contains approximately 2 to 10 atomic percent of nickel.

7. The magnetooptical storage element as claimed in claim 4 wherein said reflective layer comprises an aluminum-nickel alloy containing approximately 2 to 10 atomic percent of nickel.

8. The magnetooptical storage element as claimed in claim 4, wherein said reflective layer comprises an aluminum-nickel alloy containing an effective amount of nickel for lowering the coefficient of thermal conductivity of aluminum.

9. The magnetooptical storage element as claimed in claim 4, wherein said recording element includes a first transparent dielectric film, an amorphous alloy film containing rare earth transition metals disposed on said first transparent dielectric film, a second transparent dielectric film disposed on said amorphous alloy film and said reflective layer is disposed on said second transparent dielectric film.

10. A magnetooptical storage element having a multi-layer construction including a reflective layer, wherein said reflective layer comprises an alloy containing aluminum and an effective amount of an element for lowering the coefficient of thermal conductivity of aluminum.

11. A magnetooptical storage element as claimed in claim 10, wherein said element is one of nickel, palladium, platinum, chromium and molybdenum.

12. A magnetoooptical storage element as claimed in claim 11, wherein said element is nickel and said alloy contains approximately 2 to 10 atomic percent of nickel.

* * * * *